(12) United States Patent
Austrheim

(10) Patent No.: US 12,677,946 B2
(45) Date of Patent: Jul. 14, 2026

(54) ACCESS STATION COMPRISING SAFETY MECHANISM

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 126 days.

(21) Appl. No.: 18/704,773

(22) PCT Filed: Oct. 13, 2022

(86) PCT No.: PCT/EP2022/078541
§ 371 (c)(1),
(2) Date: Apr. 25, 2024

(87) PCT Pub. No.: WO2023/072612
PCT Pub. Date: May 4, 2023

(65) Prior Publication Data
US 2024/0415282 A1 Dec. 19, 2024

(30) Foreign Application Priority Data

Oct. 25, 2021 (NO) .................................... 20211276

(51) Int. Cl.
*A47B 88/457* (2017.01)
*A47B 88/473* (2017.01)
(Continued)

(52) U.S. Cl.
CPC .......... *A47B 88/457* (2017.01); *A47B 88/473* (2017.01); *B65G 1/137* (2013.01); *F16P 1/00* (2013.01)

(58) Field of Classification Search
CPC ... B65B 1/137; B65B 1/06; A47B 88/453–47; A47B 88/50–57; F16P 1/00; F16P 3/08
See application file for complete search history.

(56) References Cited

U.S. PATENT DOCUMENTS 3,682,113 A * 8/1972 McClellan ........... A47B 88/457
109/19
4,035,904 A * 7/1977 Ishizaka ............... B65G 1/0407
414/284
(Continued)

FOREIGN PATENT DOCUMENTS

CN 112978163 A 6/2021
CN 117652799 B * 7/2024 ............. A47B 88/50
(Continued)

OTHER PUBLICATIONS

International Search Report issued in corresponding International Application No. PCT/EP2022/078541, mailed on Feb. 13, 2023 (3 pages).
(Continued)

*Primary Examiner* — Joseph A Dillon, Jr.
(74) *Attorney, Agent, or Firm* — Baker Botts L.L.P.

(57) ABSTRACT

An access station, which is for presentation of a storage container from an automated storage and retrieval system to an operator at the access station, includes an access module, a drawer, and a first actuator. The access module includes a frame defining a drawer compartment provided within the frame and a front opening for allowing presentation of the storage container. The drawer includes a drawer base and a drawer front. The drawer is movably connected to the frame. The drawer base includes a support on which the storage container can be supported. The first actuator is for moving the drawer relative to the frame between a presentation position in which the drawer is protruding through the front opening of the frame and a retracted position in which the drawer is retracted within the drawer compartment. The access station includes a safety mechanism located above the front opening. The safety mechanism includes a cover, a safety plate, and a safety sensor. The cover is secured to the frame. The safety plate is movable relative to the cover frame.
(Continued)

between a non-activated position and an activated position. The safety sensor is for sensing the movement of the safety plate. The access station is configured to allow movement of the drawer relative to the frame when the safety sensor is sensing that the safety plate is in its non-activated position. The access station is configured to stop or reverse the movement of the drawer relative to the frame when the safety sensor has sensed that the safety plate is in its activated position.

15 Claims, 9 Drawing Sheets

(51) Int. Cl.
    B65G 1/137     (2006.01)
    F16P 1/00     (2006.01)

(56) References Cited

U.S. PATENT DOCUMENTS

| | | | | |
|---|---|---|---|---|
| 4,702,536 | A | 10/1987 | Kraynak | |
| 5,957,558 | A * | 9/1999 | Quade | A47B 88/48 |
| | | | | 312/246 |
| 8,103,379 | B2 * | 1/2012 | Biba | A47B 88/467 |
| | | | | 312/319.1 |
| 8,851,819 | B2 * | 10/2014 | Kamikawa | H01L 21/67727 |
| | | | | 414/940 |
| 10,259,014 | B2 * | 4/2019 | Rieu | A47B 88/473 |
| 10,730,078 | B2 * | 8/2020 | Wagner | G06Q 10/087 |
| 10,913,607 | B2 * | 2/2021 | Hognaland | B65G 1/0464 |
| 11,427,409 | B2 * | 8/2022 | Chintalapalli Patta | |
| | | | | B65G 1/1378 |
| 12,098,029 | B2 * | 9/2024 | Austrheim | B65G 1/06 |
| 12,240,694 | B2 * | 3/2025 | Austrheim | G07F 5/26 |
| 12,312,176 | B2 * | 5/2025 | Austrheim | B65G 1/1378 |
| 12,378,070 | B2 * | 8/2025 | Austrheim | B65G 1/1378 |
| 2004/0101386 | A1 * | 5/2004 | Robey | B65G 1/127 |
| | | | | 414/331.1 |
| 2010/0176699 | A1 * | 7/2010 | Biba | A47B 88/457 |
| | | | | 312/319.1 |

| | | | | |
|---|---|---|---|---|
| 2021/0387804 | A1 * | 12/2021 | Austrheim | F16P 3/08 |
| 2022/0194705 | A1 * | 6/2022 | Hatteland | B65G 1/0485 |
| 2022/0297938 | A1 * | 9/2022 | Austrheim | G05D 1/0011 |
| 2023/0406630 | A1 * | 12/2023 | Austrheim | B65G 1/1378 |
| 2023/0406637 | A1 * | 12/2023 | Chatain | B65G 1/0464 |
| 2024/0025643 | A1 * | 1/2024 | Austrheim | B65G 1/06 |
| 2024/0140703 | A1 * | 5/2024 | Heggebø | B65D 11/12 |
| 2024/0286842 | A1 * | 8/2024 | Skålerud | B65G 1/0464 |
| 2024/0294332 | A1 * | 9/2024 | Austrheim | B65G 1/065 |
| 2024/0336435 | A1 * | 10/2024 | Myrbakken | B65G 1/0464 |
| 2025/0136154 | A1 * | 5/2025 | Austrheim | B65G 47/06 |
| 2025/0153936 | A1 * | 5/2025 | Austrheim | B65G 1/1378 |
| 2025/0196897 | A1 * | 6/2025 | Austrheim | B65G 1/0485 |
| 2025/0221526 | A1 * | 7/2025 | Yang | E05F 15/70 |
| 2025/0320064 | A1 * | 10/2025 | Gjerdevik | B65G 1/0492 |

FOREIGN PATENT DOCUMENTS

| | | | | |
|---|---|---|---|---|
| CN | 120093094 A | * | 6/2025 | A47B 88/457 |
| IT | MI20 122 149 A1 | | 6/2014 | |
| NO | 317366 B1 | | 10/2004 | |
| WO | 2014/075937 A1 | | 5/2014 | |
| WO | 2014/090684 A1 | | 6/2014 | |
| WO | 2015/193278 A1 | | 12/2015 | |
| WO | 2017/211596 A1 | | 12/2017 | |
| WO | 2018/146304 A1 | | 8/2018 | |
| WO | 2019/206487 A1 | | 10/2019 | |
| WO | 2021/197941 A1 | | 10/2021 | |
| WO | 2021/197942 A1 | | 10/2021 | |
| WO | 2021/198036 A1 | | 10/2021 | |
| WO | 2021/198170 A1 | | 10/2021 | |

OTHER PUBLICATIONS

Written Opinion issued in corresponding International Application No. PCT/EP2022/078541, mailed on Feb. 13, 2023 (6 pages).
Office Action issued in counterpart Norwegian Patent Application No. 20211276 mailed on Oct. 26, 2021 (1 pages).
Office Action issued in counterpart Norwegian Patent Application No. 20211276 mailed on May 25, 2022 (3 pages).
Search Report issued in counterpart Norwegian Patent Application No. 20211276 mailed on May 25, 2022 (2 pages).

* cited by examiner

ACCESS STATION COMPRISING SAFETY MECHANISM

FIELD OF THE INVENTION

The present invention relates to an access station for presentation of a storage container from an automated storage and retrieval system to an operator at the access station. The present invention also relates to a method for preventing a drawer closure in an access station of an automated storage and retrieval system. The present invention also relates to a method for retrieving a storage container from or for supplying a storage container to an automated storage and retrieval system.

BACKGROUND AND PRIOR ART

FIG. 1 discloses a prior art automated storage and retrieval system 1 with a framework structure 100 and FIGS. 2, 3 and 4 disclose three different prior art container handling vehicles 201, 301, 401 suitable for operating on such a system 1.

The framework structure 100 comprises upright members 102 and a storage volume comprising storage columns 105 arranged in rows between the upright members 102. In these storage columns 105 storage containers 106, also known as bins, are stacked one on top of one another to form stacks 107. The members 102 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301, 401 may be operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201, 301, 401 in a first direction X across the top of the frame structure 100, and a second set of parallel rails 111 arranged perpendicular to the first set of rails 110 to guide movement of the container handling vehicles 201, 301, 401 in a second direction Y which is perpendicular to the first direction X. Containers 106 stored in the columns 105 are accessed by the container handling vehicles 201, 301, 401 through access openings 112 in the rail system 108. The container handling vehicles 201, 301, 401 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supporting.

Each prior art container handling vehicle 201, 301, 401 comprises a vehicle body 201a, 301a, 401a and first and second sets of wheels 201b, 201c, 301b, 301c, 401b, 401c which enable the lateral movement of the container handling vehicles 201, 301, 401 in the X direction and in the Y direction, respectively. In FIGS. 2, 3 and 4 two wheels in each set are fully visible. The first set of wheels 201b, 301b, 401b is arranged to engage with two adjacent rails of the first set 110 of rails, and the second set of wheels 201c, 301c, 401c is arranged to engage with two adjacent rails of the second set 111 of rails. At least one of the sets of wheels 201b, 201c, 301b, 301c, 401b, 401c can be lifted and lowered, so that the first set of wheels 201b, 301b, 401b and/or the second set of wheels 201c, 301c, 401c can be engaged with the respective set of rails 110, 111 at any one time.

Each prior art container handling vehicle 201, 301, 401 also comprises a lifting device for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201, 301, 401 so that the position of the gripping/engaging devices with respect to the vehicle 201, 301, 401 can be adjusted in a third direction Z which is orthogonal the first direction X and the second direction Y. Parts of the gripping device of the container handling vehicles 301, 401 are shown in FIGS. 3 and 4 indicated with reference number 304, 404. The gripping device of the container handling device 201 is located within the vehicle body 201a in FIG. 2 and is thus not shown.

Conventionally, and also for the purpose of this application, Z=1 identifies the uppermost layer available for storage containers below the rails 110, 111, i.e. the layer immediately below the rail system 108, Z=2 the second layer below the rail system 108, Z=3 the third layer etc. In the exemplary prior art disclosed in FIG. 1, Z=7 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=17, Y=1, Z=5. The container handling vehicles 201, 301, 401 can be said to travel in layer Z=0, and each storage column 105 can be identified by its X and Y coordinates. Thus, the storage containers shown in FIG. 1 extending above the rail system 108 are also said to be arranged in layer Z=0.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y- and Z-direction.

Each prior art container handling vehicle 201, 301, 401 comprises a storage compartment or space for receiving and stowing a storage container 106 when transporting the storage container 106 across the rail system 108. The storage space may comprise a cavity arranged internally within the vehicle body 201a, 401a as shown in FIGS. 2 and 4 and as described in e.g. WO2015/193278A1 and WO2019/206487A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The cavity container handling vehicle 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the cavity container handling vehicles 401 may have a footprint which is larger than the lateral area defined by a storage column 105 as shown in FIGS. 1 and 4, e.g. as is disclosed in WO2014/090684A1 or WO2019/206487A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail 110, 111 may comprise two parallel tracks. In other rail systems 108, each rail in one direction (e.g. an X direction) may comprise one track and each rail in the other, perpendicular direction (e.g. a Y direction) may comprise two tracks. Each rail 110, 111 may also comprise two track members that are fastened together, each track member providing one of a pair of tracks provided by each rail.

WO2018/146304A1, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201, 301, 401 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119, 120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119, 120 for further transportation to an access station. The transportation from the port to the access station may require movement along various different directions, by means such as delivery vehicles, trolleys or other transportation lines. Note that the term 'tilted' means transportation of storage containers 106 having a general transportation orientation somewhere between horizontal and vertical.

In FIG. 1, the first port column 119 may for example be a dedicated drop-off port column where the container handling vehicles 201, 301, 401 can drop off storage containers 106 to be transported to an access or a transfer station, and the second port column 120 may be a dedicated pick-up port column where the container handling vehicles 201, 301, 401 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119, 120 and the access station.

If the port columns 119, 120 and the access station are located at different levels, the conveyor system may comprise a lift device with a vertical component for transporting the storage containers 106 vertically between the port column 119, 120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201, 301, 401 is instructed to retrieve the target storage container 106 from its position and transport it to the drop-off port column 119. This operation involves moving the container handling vehicle 201, 301, 401 to a location above the storage column 105 in which the target storage container 106 is positioned, retrieving the storage container 106 from the storage column 105 using the container handling vehicle's 201, 301, 401 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201, 301, 401 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201, 301, 401 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201, 301, 401 positions the storage container 106 at the desired position. The removed storage containers 106 may then be lowered back into the storage column 105, or relocated to other storage columns 105.

For monitoring and controlling the automated storage and retrieval system 1, e.g. monitoring and controlling the location of respective storage containers 106 within the framework structure 100, the content of each storage container 106; and the movement of the container handling vehicles 201, 301, 401 so that a desired storage container 106 can be delivered to the desired location at the desired time without the container handling vehicles 201, 301, 401 colliding with each other, the automated storage and retrieval system 1 comprises a control system 500 which typically is computerized and which typically comprises a database for keeping track of the storage containers 106.

Access stations represents a safety risk, as the operators are vulnerable to pinch injuries of hands/fingers when parts of the access station are moving. Some access stations are "internal", i.e. they are used by operators which have been educated with respect to safety during use of the access station. However, some access stations are "external", i.e. they are used by customers picking up products they have ordered. Such external access stations are commonly referred to as pick-up points or pick-up stations. These customers have not been educated with respect to safety, and hence, extra safety measures should be present to avoid pinch injuries.

WO 2017/211596 describes an access station with a drawer, where a storage container can be lowered into the drawer or retrieved from the drawer when the drawer is closed, and where the storage container can be accessed by a person when the drawer is open. This access station may be used as an internal access station. This access station may also comprise a user interface via which a customer may get access to the access station. Hence, this access station may also be used as an external access station. The drawer has a handle for manually opening/closing the drawer.

The AutoStore SwingPort (https://www.youtube.com/watch?v=YycttBTySNg) comprises two horizontally sliding covers which are entirely preventing access to the storage container during movement of the storage container. Consequently, there is a first waiting period from the picking operation is finished until the storage container can move (as the sliding covers must close), and there is a second waiting period from the next storage container is in the picking position until the picking may start (as the sliding covers must open).

Other access stations comprise a cover inserted around the access opening to the storage container in the port. If a hand or other object is present when the storage container is moved, the cover will move relative to other parts of the access station. This relative movement of the cover will be sensed by a sensor, which then stops the movement of the storage container within the access station. In case of an incident causing the cover to move, the cover must be moved back to its original position before the access station can operated as normal again.

One object of the present invention is to provide an access station wherein the access opening to the storage container can be opened and closed automatically.

One object of the present invention is to provide an access station wherein the risk of pinch injuries is reduced.

One object of the present invention is to provide a more efficient access station.

SUMMARY OF THE INVENTION

The present invention relates to an access station for presentation of a storage container from an automated storage and retrieval system to an operator at the access station, wherein the access station comprises:

an access module comprising a frame defining a drawer compartment provided within the frame and a front opening for allowing presentation of the storage container;

a drawer comprising a drawer base and a drawer front, wherein the drawer is movably connected to the frame and wherein the drawer base comprises a support on which the storage container can be supported;

a first actuator for moving the drawer relative to the frame between a presentation position in which the drawer is protruding through the front opening of the frame and a retracted position in which the drawer is retracted within the drawer compartment;

wherein the access station comprises a safety mechanism located above the front opening;

wherein the safety mechanism comprises:

a cover secured to the frame;

a safety plate movable relative to the cover between a non-activated position and an activated position;

a safety sensor for sensing the movement of the safety plate;

wherein the access station is configured to allow movement of the drawer relative to the frame when the safety sensor is sensing that the safety plate is in its non-activated position and wherein the access station is configured to stop or reverse the movement of the drawer relative to the frame when the safety sensor has sensed that the safety plate is in its activated position.

In one aspect, the cover is secured to the frame above the front opening.

Hence, an object protruding up from the storage container when the drawer is moving from the presentation position to the retracted position will push the safety plate from the non-activated position to the activated position, hence causing the movement of the drawer to stop or reverse.

In one aspect, the safety plate is preventing the storage container from being retrieved from the drawer when the safety plate is in the non-activated position.

In one aspect, the safety plate is positioned partially above the storage container when the drawer is in the presentation position and the safety plate is in the non-activated position.

As used herein, the storage container has an upper proximal side edge and an upper distal side edge. The upper proximal side edge is proximal, i.e. closer to, the drawer front than the upper distal side edge. As the storage container is located within the drawer, the upper proximal side edge will also be proximal, i.e. closer to, the operator than the upper distal side edge.

In one aspect, the safety plate is positioned partially above an upper distal side edge of the storage container, the upper distal side edge being distal to the drawer front when the drawer is in the presentation position and the safety plate is in the non-activated position.

In one aspect, the safety plate is preventing the storage container from being retrieved from the drawer when the safety plate is in the activated position.

In one aspect, the safety plate is positioned partially above the storage container when the drawer is in the presentation position and the safety plate is in the activated position.

In one aspect, the safety plate is positioned partially above an upper distal side edge of the storage container, the upper distal side edge being distal to the drawer front when the drawer is in the presentation position and the safety plate is in the activated position.

In one aspect, the presentation position is the position of the drawer in which the drawer front is furthest away from the front opening.

In one aspect, the drawer front is vertically aligned with the front opening in the retracted position. Alternatively, the drawer front may be retracted further into the drawer compartment than the front opening.

In one aspect, the access station comprises a control system configured to control the first actuator based on signals from the safety sensor.

In one aspect, the access station comprises a user interface, wherein the control system is configured to control the first actuator based on user input from the user interface and based on signals from the safety sensor.

In one aspect, the first actuator is a two-way actuator for moving the drawer from the presentation position to the retracted position and for moving the drawer from the retracted position to the presentation position. Alternatively, the first actuator comprises two one-way actuators, the first one for moving the drawer from the presentation position to the retracted position and a second one for moving the drawer from the retracted position to the presentation position.

In one aspect, the user interface is used to initiate the movement of the drawer from the presentation position to the retracted position.

In one aspect, the user interface is used to initiate the movement of the drawer from the retracted position to the presentation position.

In one aspect, the control system is provided in communication with a control system of the automated storage and retrieval system.

In one aspect, the frame comprises a guard defining an upper border of the front opening.

In case of external access stations, the purpose of the guard is typically to protect the access station from tampering etc. However, in case of internal access stations, the purpose of the guard may be to help prevent non-intended access to moving parts as well as to strengthen the frame mechanically.

In one aspect, the cover is at least partially forming the guard and wherein the safety mechanism is configured to trip in order to prevent an object from being squeezed between the drawer front and the guard during movement of the drawer from the presentation position to the retracted position.

In one aspect, the safety mechanism is also configured to prevent an object from being squeezed between an upper proximal side edge of the storage container, the upper proximal side edge being proximal to the drawer front, and the guard during movement of the drawer from the presentation position to the retracted position.

In one aspect, the safety plate is further movable relative to the cover to a container handling position when the drawer is in the presentation position; wherein the storage container may be retrieved from the drawer and/or the storage container may be inserted into the drawer when the safety plate is in the container handling position; and/or wherein the access station is configured to prevent movement of the drawer relative to the frame when the safety sensor is sensing that the safety plate is in the container handling position.

In one aspect, the container handling position and the activated position is the same position. Alternatively, the container handling position is different from the activated position. In one embodiment, the activated position is an intermediate position between the non-activated position and the container handling position.

In one aspect, the safety plate comprises a handle for manually moving the safety plate between the non-activated position and the activated position or for manually moving the safety plate between the non-activated position, the activated position and the container handling position.

In one aspect, the access module comprises a top opening through which a storage container is retrievable from the drawer and through which a storage container is receivable by the drawer, and wherein the safety plate is at least partially obstructing the top opening in the activated position or in the container handling position.

Hence, unintentional collisions between storage containers and/or unintentional jamming of storage containers in the access station may be prevented.

The guard may also, together with other parts, protect the operator from pinching injuries caused by the storage container and/or the gripping device of the container handling vehicle moving vertically above the top opening.

In one aspect, the safety mechanism comprises a releasable lock for preventing the safety plate to move to the container handling position, wherein the access station is configured to release the releasable lock if a predetermined condition is fulfilled.

In case of external access stations, insertion and/or retrieval of storage containers are normally not allowed and the releasable lock may be set as default to be locked. However, should an incident occur, an operator may be allowed to release the lock by inputting an access code via the user interface, by using a key etc. in order to move the safety plate to the container handling position, for example for removing a jammed storage container. In case of internal access stations, insertion and/or retrieval of storage containers are normally allowed, and the access station may not have a releasable lock or the releasable lock may be set as default to be released.

In one aspect, the safety plate is a rectangular, flat body slidably mounted to the cover.

In one aspect, the safety plate is slidably mounted below the cover.

In one aspect, the cover comprises guides for guiding the safety plate relative to the cover.

In one aspect, the safety sensor is an electromagnetic sensor. In one aspect, the sensor comprises two parts, a first sensor part fastened to the cover and a second sensor part fastened to the safety plate. When the first part is in contact with the second part, the safety sensor senses that the safety plate is in the non-activated position.

According to the above, the safety mechanism will provide safety even during a container handling operation in which storage containers are inserted into the drawer or retrieved from the drawer, as the access station will require the flap to be moved back to the initial non-activated position before the drawer will close to allow the storage container to be lifted away from the drawer by a container handling vehicle or to allow a storage container to be received in the drawer by a container handling vehicle. In prior art, safety mechanisms to avoid pinch injuries must be disabled or physically removed to allow the above container handling operation.

The term "operator" is used herein to describe a person or robot which is performing a picking operation, i.e. to pick one or more product items from a storage container, or a supplying operation, i.e. to insert one or more product items into the storage container. The term "operator" is also used herein to describe a person or robot which are performing a container supplying operation, i.e. to insert a storage container into the access station, or a container retrieval operation, i.e. to retrieve a storage container from the access station.

The term "container handling" and "container handling operation" are used herein to describe the action of supplying storage containers to the automated storage and retrieval system and/or the action of retrieving storage containers from the automated storage and retrieval system. The storage containers may be filled with product items, or they may be empty. Hence, this term is not used to describe the actions performed by the container handling vehicles operating on the rail system on top of the framework structure—these container handling vehicles are moving storage containers which has already been supplied into the system.

In one aspect, the support of the drawer is defined with a front position and a rear position; wherein the access station comprises a second actuator for moving the storage container from the front position to the rear position; and wherein the storage container is presented to the operator when the storage container is in the front position and when the drawer is in the presentation position.

In one aspect, the storage container in the rear position is positioned below the top opening when the drawer is in the presentation position.

In one aspect, the storage container in the front position is positioned below the top opening when the drawer is in the retracted position.

In one aspect, the frame comprises vertical side guiding plates for guiding sides edges of the drawer front as it extends out to the presentation position and as it retracts to the retracted position.

In one aspect, the vertical side guiding plates are a snug fit to the drawer front to reduce gaps and a possible risk of crushing fingers/hands during movement of the drawer. In one aspect, a resilient material is positioned between the guiding plates and the drawer front to reduce gaps and risks further.

In one aspect, the frame comprises a lower horizontal guiding plate for guiding a lower edge of the drawer front as it extends out to the presentation position and as it retracts to the retracted position. Also this lower guiding plate is a snug fit to the drawer front to reduce risk of crushing fingers/hands during movement of the drawer.

The side guiding plates and the lower guiding plate are fixed in relation to the access module and the automated storage and retrieval system and is therefore visible for the operator and other persons working near the framework structure of the system. Hence, when the drawer is moved from the retracted position to the presentation position, this movement will not create a surprising obstacle for nearby personnel, as the drawer front is moved in the space between the vertical guiding plates and the lower, horizontal guiding plate.

In one aspect, the side guiding plates, the lower guiding plate and the guard together define the borders of the front opening.

The present invention also relates to a method for preventing a drawer closure in an access station of an automated storage and retrieval system, wherein the method comprises the following steps:

a) receiving a first storage container in a drawer when the drawer is in a retracted position within an access module;

b) moving the drawer to a presentation position in which the first storage container is presented to the operator;

c1) moving the drawer to a retracted position within the access module if a safety plate is maintained in a non-activated position; and/or c2) stopping/reversing the movement of the drawer if the safety plate is moved to an activated position.

The present invention relates to a method for retrieving a storage container from or for supplying a storage container to an automated storage and retrieval system, wherein the method comprises the following steps:

a) moving a drawer from a retracted position within an access module to a presentation position;

b) moving a safety plate of a safety mechanism to a container handling position;

c) retrieving the storage container from the drawer or supplying the storage container to the drawer;

d) moving the safety plate to a non-activated position of the safety mechanism;

e) moving the drawer from the presentation position to the retracted position;

f) moving the storage container between the drawer and a storage column within the automated storage and retrieval system by means of a container handling vehicle.

When retrieving a storage container from the system, steps a)-f) are performed in sequence. When supplying a storage container to the system, step f) is performed first, then steps a)-e) are performed.

In one aspect, step e) further comprises the step of:

stopping or reversing the movement of the drawer from the presentation position to the retracted position if the safety plate is moved to an activated position.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
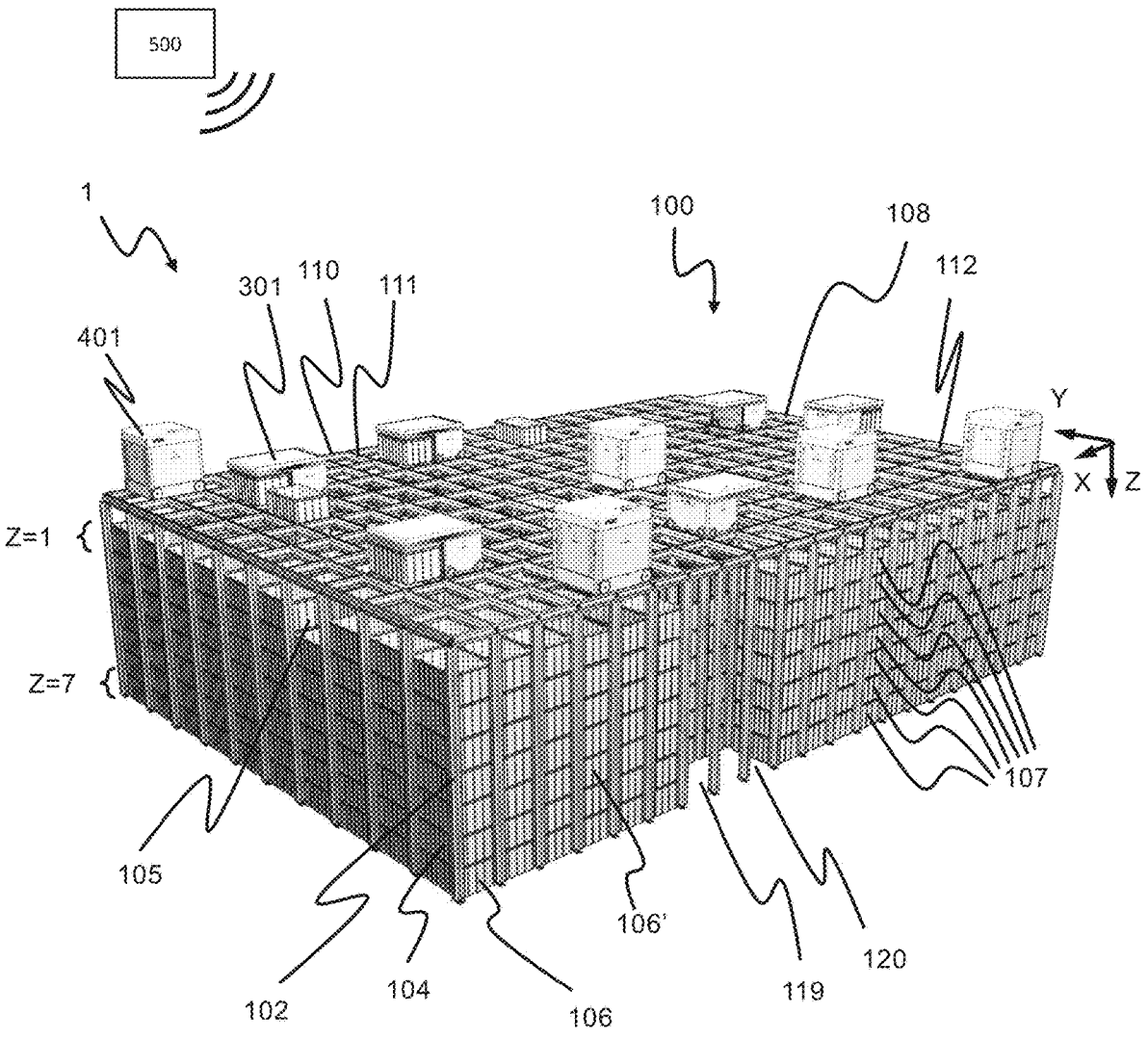
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Figure 2:
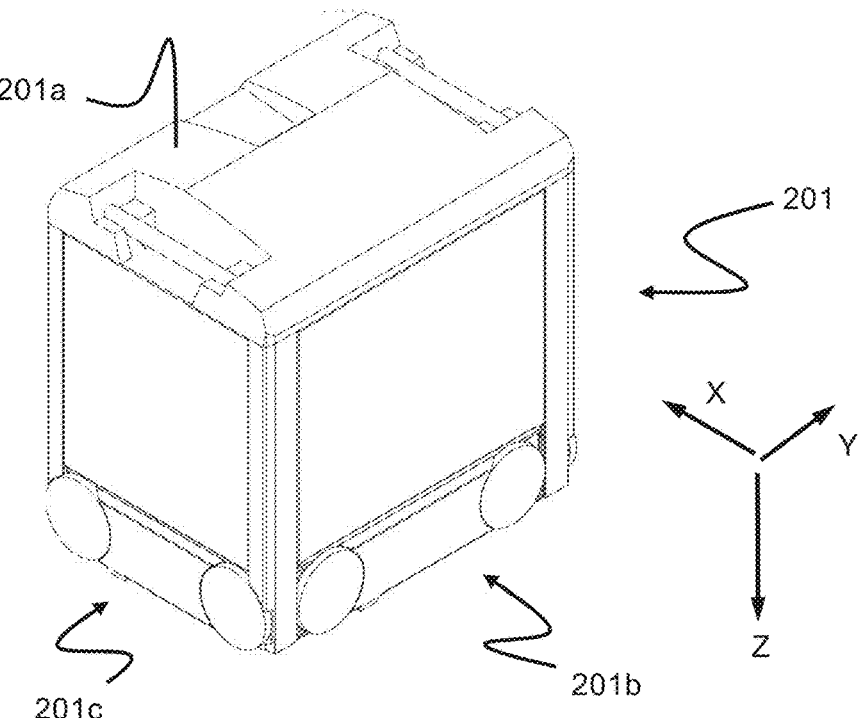
FIG. 2 is a perspective view of a prior art container handling vehicle having an internally arranged cavity for carrying storage containers therein.
Figure 3:
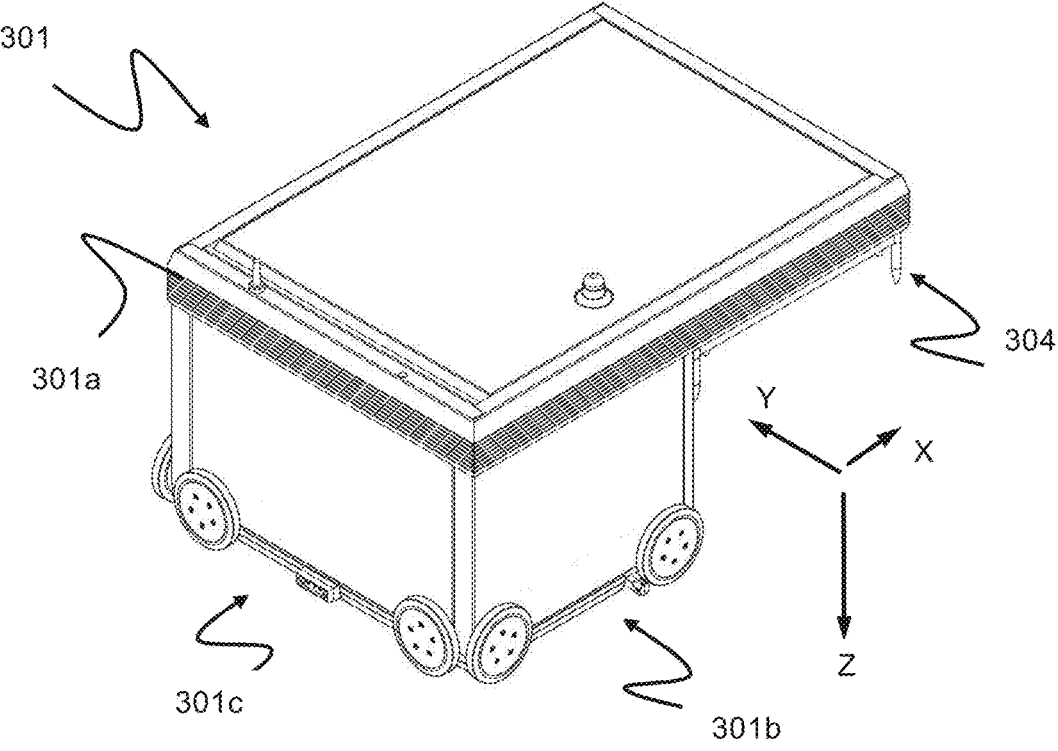
FIG. 3 is a perspective view of a prior art container handling vehicle having a cantilever for carrying storage containers underneath.
Figure 4:
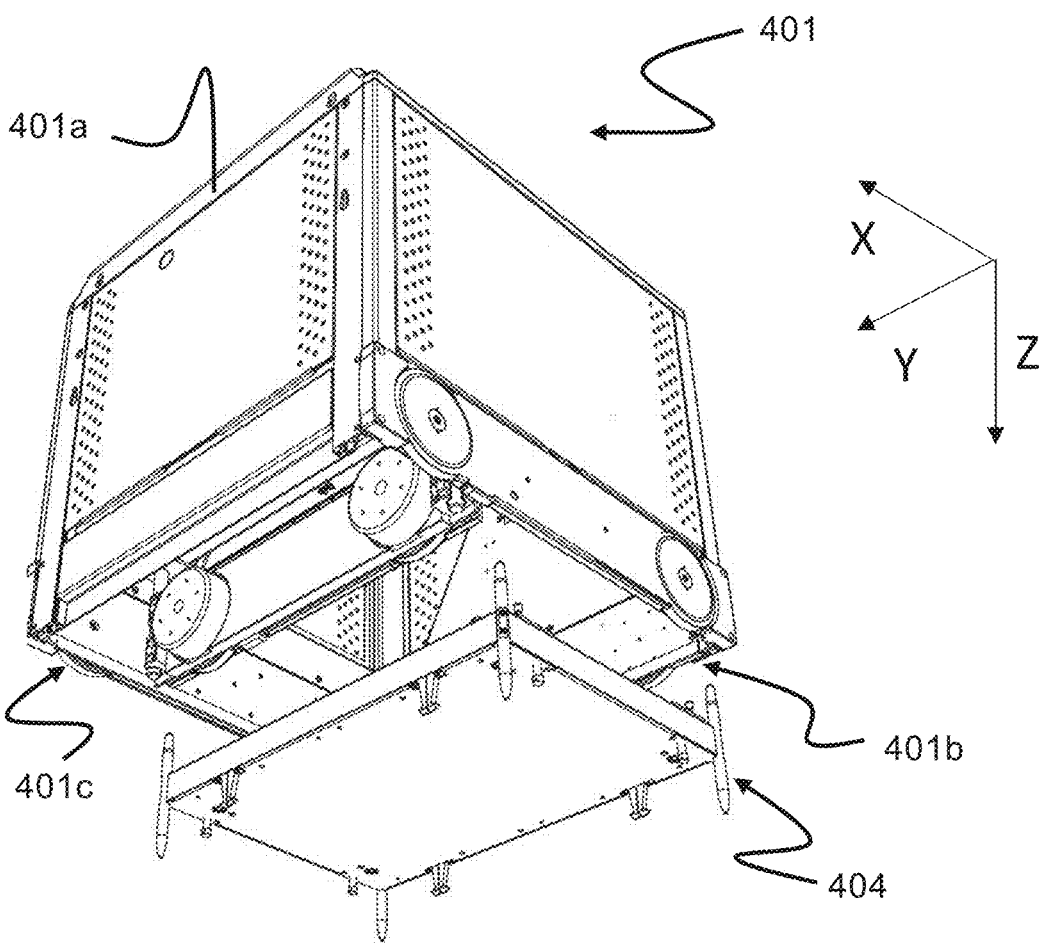
FIG. 4 is a perspective view, seen from below, of a prior art container handling vehicle having an internally arranged cavity for carrying storage containers therein.

The framework structure 100 of the automated storage and retrieval system 1 is constructed in a similar manner to the prior art framework structure 100 described above in connection with FIGS. 1-3. That is, the framework structure 100 comprises a number of upright members 102, and comprises a first, upper rail system 108 extending in the X direction and Y direction. The framework structure 100 may also be of the type shown in WO2021198036, WO2021197941, WO2021197942, WO2021198170 or similar storage systems.

The framework structure 100 further comprises storage compartments in the form of storage columns 105 provided between the members 102 wherein storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

Figure 5A:
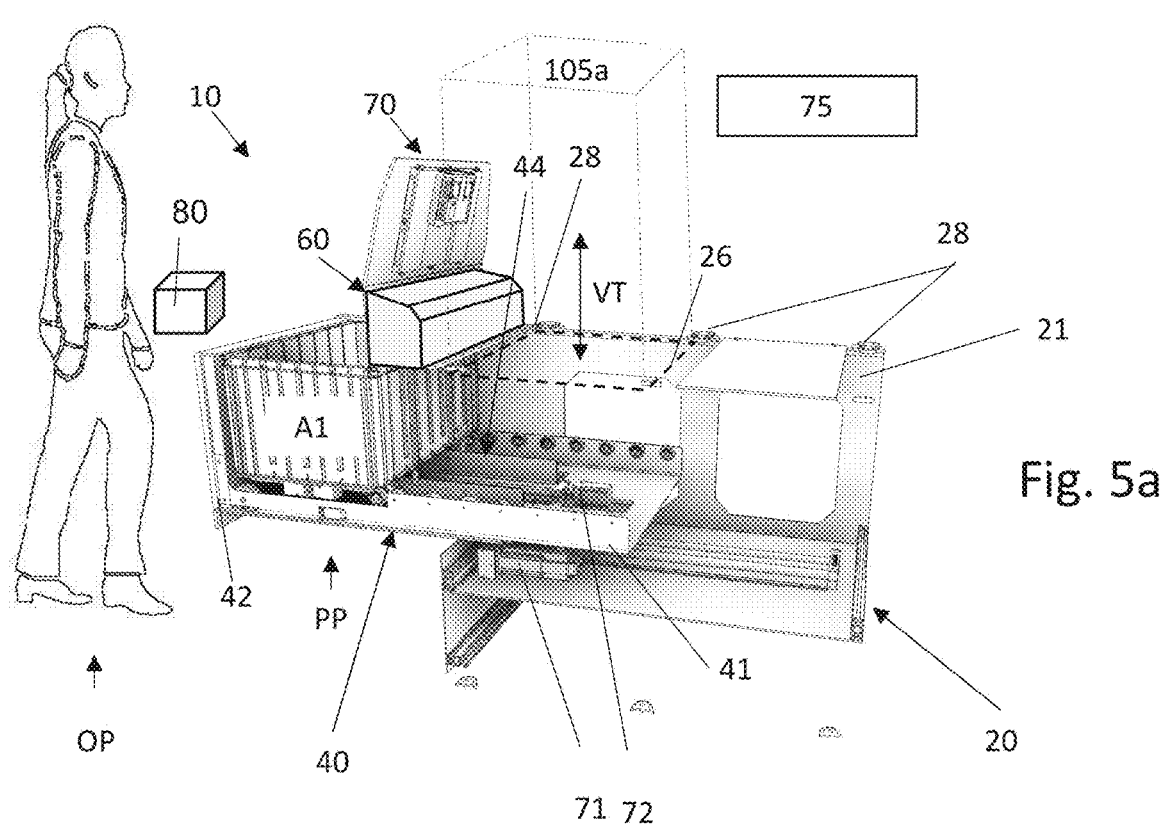
FIG. 5a is a perspective side view of an access station with its drawer in its presentation position, wherein parts of the frame have been removed to be able to see the drawer.
Figure 5B:
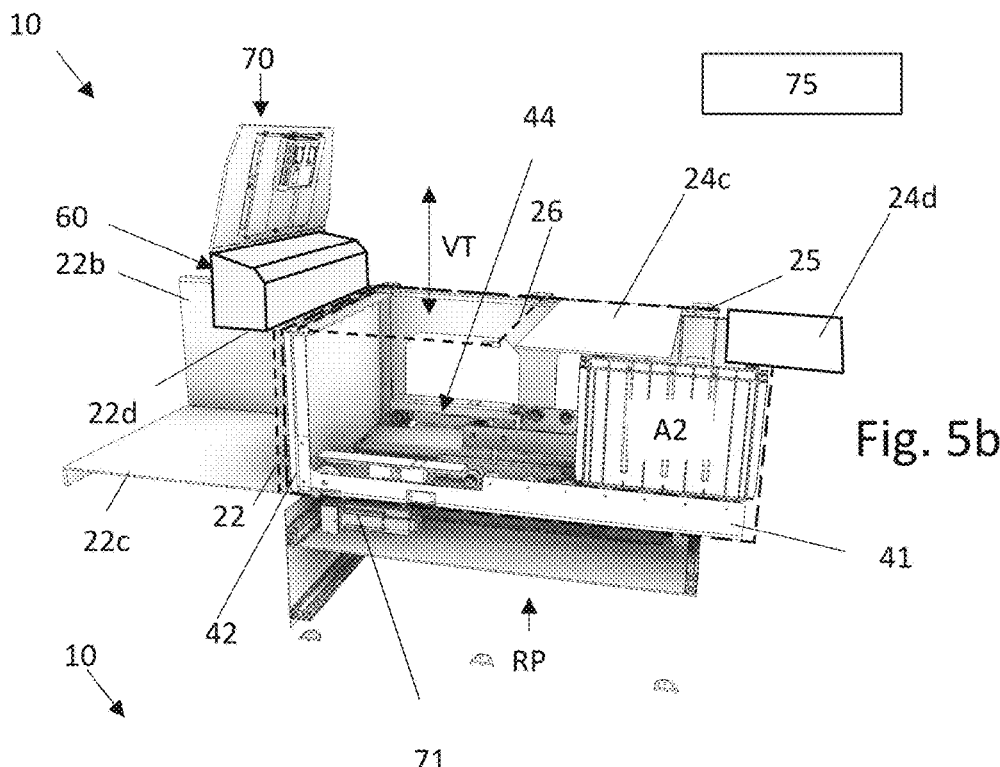
FIG. 5b is a perspective side view of the access station with the drawer in its retracted position.

It is now referred to FIG. 5a and FIG. 5b, wherein it is shown an access station 10. The access station 10 is at least partially integrated with the framework structure 100 of the automated storage and retrieval system 1 shown in FIG. 1.

Access Module 20, Drawer 40 and Actuators 71, 72

The access station 10 comprises an access module 20 comprising a frame 21 defining a drawer compartment 25 provided within the frame 21. The frame 21 is defined with a front opening 22 for accessing the drawer compartment 25 from the front side and is defined with a top opening 26 for accessing the drawer compartment 25 from above. The top opening 26 is located below one of the storage columns 105 of the system 1, as indicated by dotted lines in FIG. 5a. Hence, the column above the top opening 26, indicated as column 105a in FIG. 5a, is not a storage column 105, the column 105 serves as a transportation column through which one of the container handling vehicles 201, 301, 401 may insert a storage container into the access station by lowering it down through the column 105a and further through the top opening 26 and/or retrieve a storage container from the access station by lifting it through the top opening 26 and further up through the column 105a.

Figures 6A, 6B:
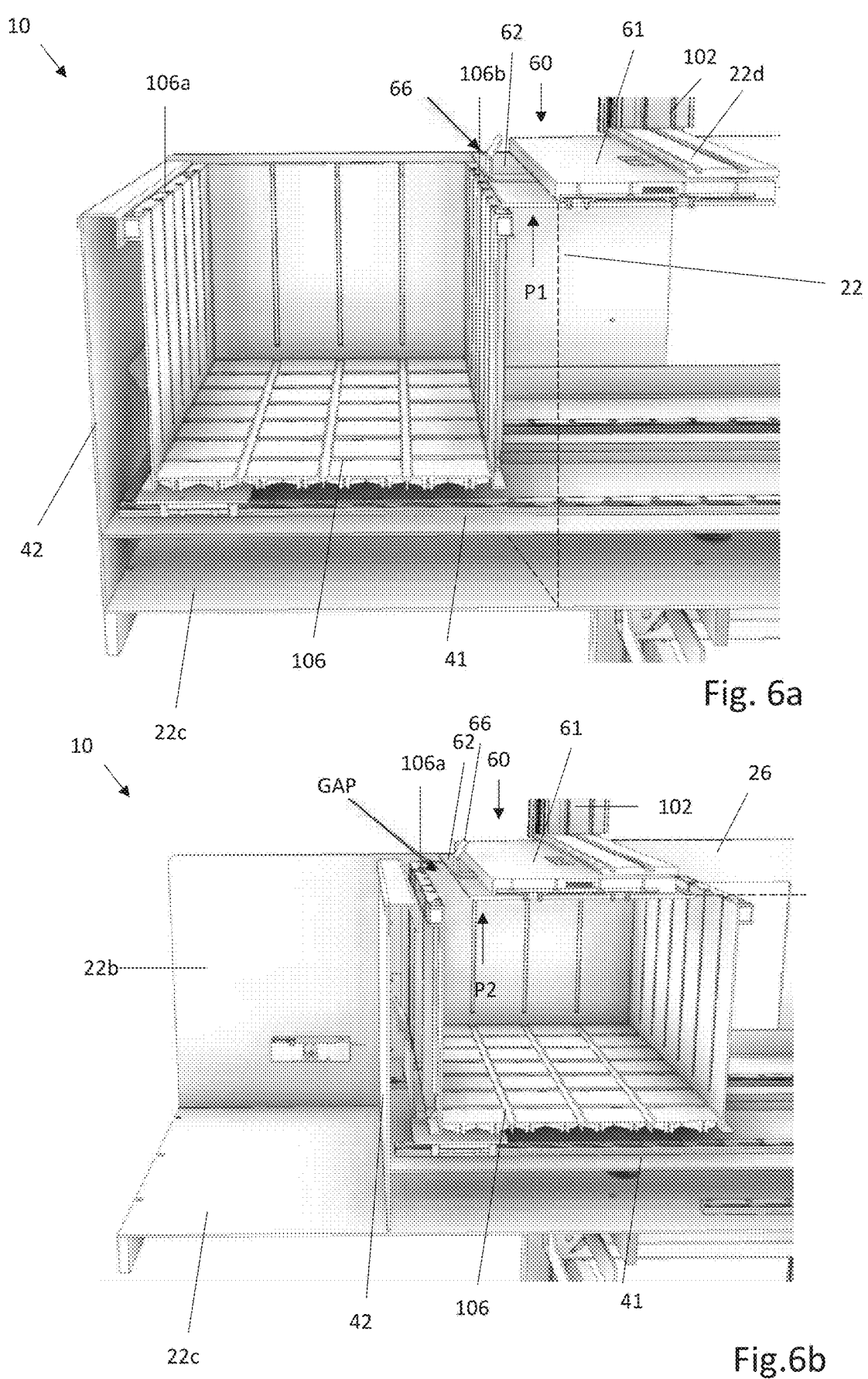
FIG. 6a is a perspective side view of a safety mechanism and parts of the access module and the drawer, wherein the safety plate is in the non-activated position.
FIG. 6b corresponds to FIG. 6a, wherein the safety plate is moved from its non-activated position towards its activated position.

In FIG. 5a it is shown that the frame 21 comprises lintels 28 for supporting vertical members 102 of the framework structure 100. In FIG. 6a, one vertical member 102 is shown supported by the frame 21.

The access station 10 further comprises a drawer 40 comprising a drawer base 41 and a drawer front 42, wherein the drawer 40 is movably connected to the frame 21 and wherein the drawer base 41 comprises a support 44 on which the storage container 106 can be supported.

The access station 10 further comprises a first actuator 71 for moving the drawer 40 relative to the frame 21 between a presentation position PP in which the drawer 40 is protruding through the front opening 22 of the frame 21, shown in FIG. 5a, and a retracted position RP in which the drawer 40 is retracted within the drawer compartment 25, as shown in FIG. 5b.

In the present embodiment, the support 44 of the drawer 40 is defined with a front position A1 and a rear position A2. The access station 10 further comprises a second actuator 72 for moving the storage container 106 from the front position A1 to the rear position A2 relative to the support 44. The support 44 may comprise rollers, wheels, rails etc. to ease the movement of the storage container.

The storage container 106 is presented to the operator OP when the storage container 106 is in the front position A1 and when the drawer 40 is in the presentation position PP. If there is a storage container present in the rear position A2, it will be positioned below the top opening 26 when the drawer 40 is in the presentation position PP. Typically, the storage container 106 in the rear position A2 will be lifted out via the top opening 26 during the period of time the storage container in the front position A1 is presented to the operator.

When the drawer 40 is in the retracted position RP, the storage container in the front position A1 is positioned below the top opening 26. Typically, a storage container will be lifted down through the top opening 26 and into the front position A1 when the drawer 40 is in the retracted position RP.

Preferably, the storage container in the front position A1 is moved to the rear position A2 when the drawer is in the retracted position RP. It is also possible that the storage container in the front position A1 is moved to the rear position A2 during the movement of the drawer 40 from the presentation position PP to the retracted position RP.

The frame 21 comprises vertical side guiding plates 22b for guiding sides edges of the drawer front 42 as it extends out to the presentation position PP and as it retracts to the retracted position RP. The vertical side guiding plates are a snug fit to the drawer front to reduce gaps and a possible risk of crushing fingers/hands during movement of the drawer. The frame 21 also comprises a lower horizontal guiding plate 22c for guiding a lower edge of the drawer front 42 as it extends out to the presentation position PP and as it retracts to the retracted position RP. Also this lower guiding plate is a snug fit to the drawer front to reduce risk of crushing fingers/hands during movement of the drawer.

The side guiding plates and the lower guiding plate are fixed in relation to the access module and the framework structure 100 of the automated storage and retrieval system 1 and is therefore visible for the operator and other persons working near the framework structure of the system. Hence, when the drawer 40 is moved from the retracted position RP to the presentation position PP, this movement will not create a surprising obstacle for nearby personnel, as the drawer front 42 is moved in the space between the vertical guiding plates and the lower, horizontal guiding plate.

In FIG. 6a, it is shown that the frame 21 comprises a guard 22d. The guard 22d, together with the side guiding plates and the lower guiding define the borders of the front opening. When the drawer 40 is in the retracted position RP, the front 42 of the drawer 40 is closing the front opening 22.

User Interface 70 and Control System 75

The access station 10 further comprises a user interface 70 and a control system 75. The control system 75 is provided in communication with the user interface 70, the first actuator 71 and the second actuator 72. The control system 75 is provided in communication with a control system 500 of the automated storage and retrieval system 1 and/or the container handling vehicles 201, 301, 401. In this way, the lowering/elevating of the storage containers through the transportation column 105a and the top opening 26 is coordinated with the movement of the drawer 40 between the presentation position PP and the retracted position RP and with the movement of the storage container between the front position A1 and the rear position A2.

Safety Mechanism 60

The access station 10 further comprises a safety mechanism 60, generally indicated as a breadbin-like structure in FIG. 5a and FIG. 5b. The safety mechanism 60 is located above the front opening 22.

It is now referred to FIG. 6a. Here, it is shown that the safety mechanism 60 comprises a cover 61 secured to the frame 21. In the present embodiment, the cover 61 is secured to the guard 22d. However, the cover 61 may alternatively be integrated with the guard 22d.

Figure 7:
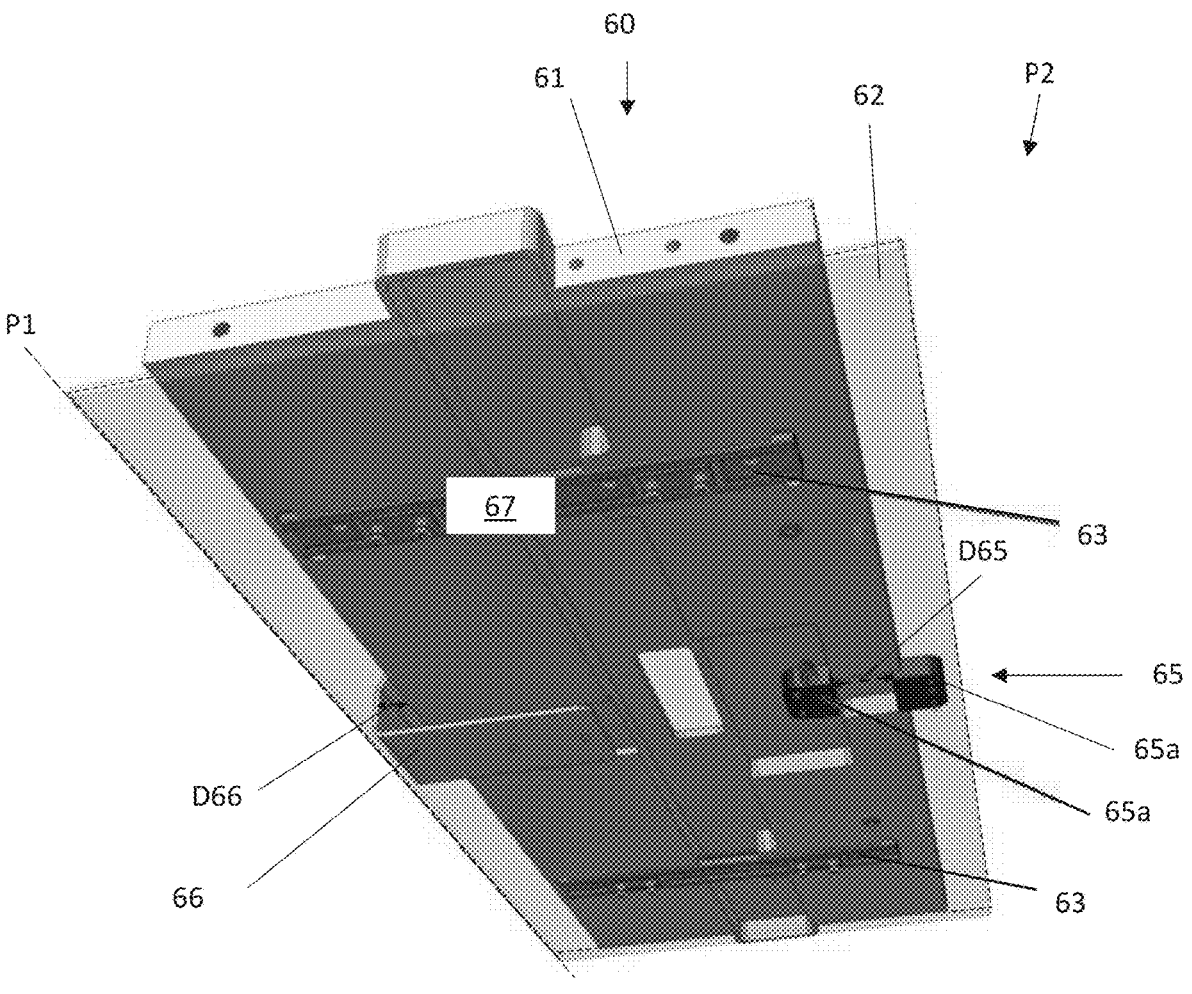
FIG. 7 illustrates the safety mechanism from below. It should be noted that both the non-activated position and the activated position of the safety plate is indicated.

The safety mechanism 60 further comprises a safety plate 62 in the form of a rectangular, flat body. In FIG. 7, it is shown that the cover 61 comprises guides 63 for guiding a sliding movement of the safety plate 62 relative to the cover 61. The safety plate 62 comprises a handle 66 for manually moving the safety plate 62 relative to the cover 61.

The safety mechanism 60 further comprises a safety sensor 65 for sensing the movement of the safety plate 62. In the present embodiment, the safety sensor 65 is an electromagnetic sensor comprising two parts, a first sensor part 65a fastened to the cover 61 and a second sensor part 65b fastened to the safety plate. The safety sensor 65 is provided in communication with the control system 75.

In FIG. 6a, the storage container 106 is shown with an upper proximal side edge 106a being proximal to the drawer front 42 and an upper distal side edge 106b being distal to the drawer front 42. It is also shown that the safety plate 62 is located immediately above the upper distal side edge 106b. Hence, it is not possible for the operator to insert fingers in the narrow vertical gap defined between upper distal side edge 106b and the safety plate 62.

The safety mechanism 60 also comprises a releasable lock 67 for preventing the safety plate 62 to move relative to the cover 61.

The Function of the Safety Mechanism 60

How the storage container 106 is moved internally within the access station 10 and how the storage container 106 is moved between the access station 10 and the storage column 105 within the framework structure 100 has been described above. The function of the safety mechanism 60 will now be described.

Initially, it should be noted that the present access station 10 has two main purposes. First, the access station 10 is opening the drawer 40 to present the storage container 106 to an operator OP, for the purpose of picking a product item 80 from the presented storage container 106, or for the purpose of inserting the product item 80 into the presented storage container 106. Second, the access station 10 is opening the drawer 40 to present the storage container to the operator for the purpose of retrieving the entire storage container from the access station, or the access station 10 is opening the drawer 40 for the purpose of inserting or supplying a storage container to the access station.

The safety mechanism during a picking/supplying operation will first be described. It is now referred to FIG. 6a and FIG. 8a, wherein the drawer is in the presentation position PP. Here, the safety plate 62 is in a non-activated position P1. As the safety plate 62 is located above the upper distal side edge 106b, it is not possible for the operator to lift the storage container 106 out from the drawer. The safety plate 62 may be locked in this position P1 by means of the locking mechanism 67 when the drawer is in the presentation position PP.

Figure 8A:
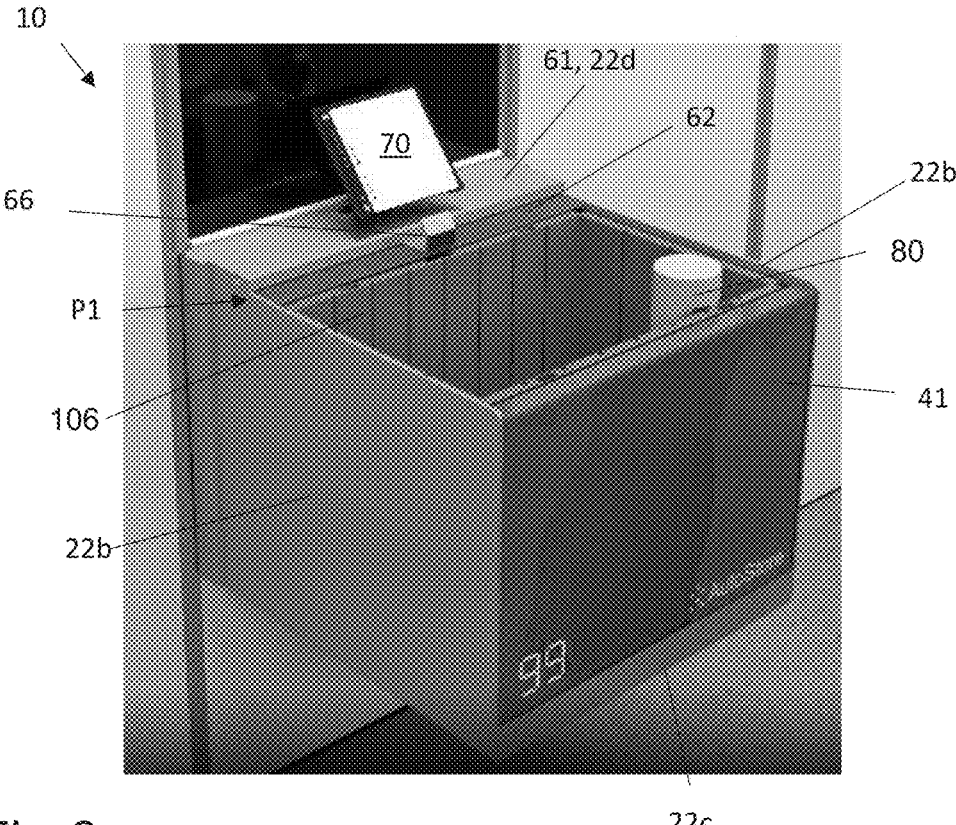
FIG. 8a illustrates the drawer in the presentation position, with a product item protruding from the storage container.

The operator now inserts the product item 80 into the storage container 106. As shown in FIG. 8a, the product item 80 projects up from the storage container 106. The operator now uses the user interface 70 to initiate the closing of the drawer 40. It should be noted that when the drawer 40 starts to move, the locking mechanism 67 releases the safety plate 62, thereby allowing the safety plate 62 to move. Again, it is not possible for the operator to lift the storage container 106 out from the drawer 40, as the drawer is moving the storage container towards the drawer compartment.

Figure 8B:
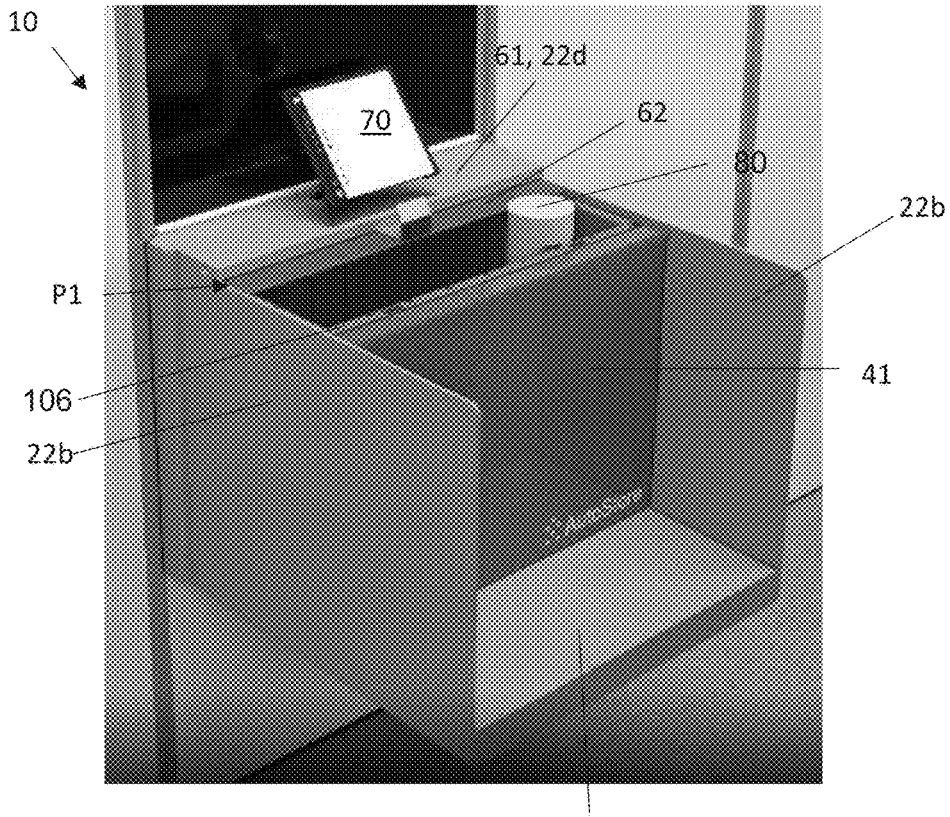
FIG. 8b illustrates the drawer being moved to a position in which the product item is in contact with the safety plate.

It is now referred to FIG. 8b. Here, the product item 80 is brought into contact with the safety plate 62. The safety plate 62 is still in the non-activated position P1.

Figure 8C:
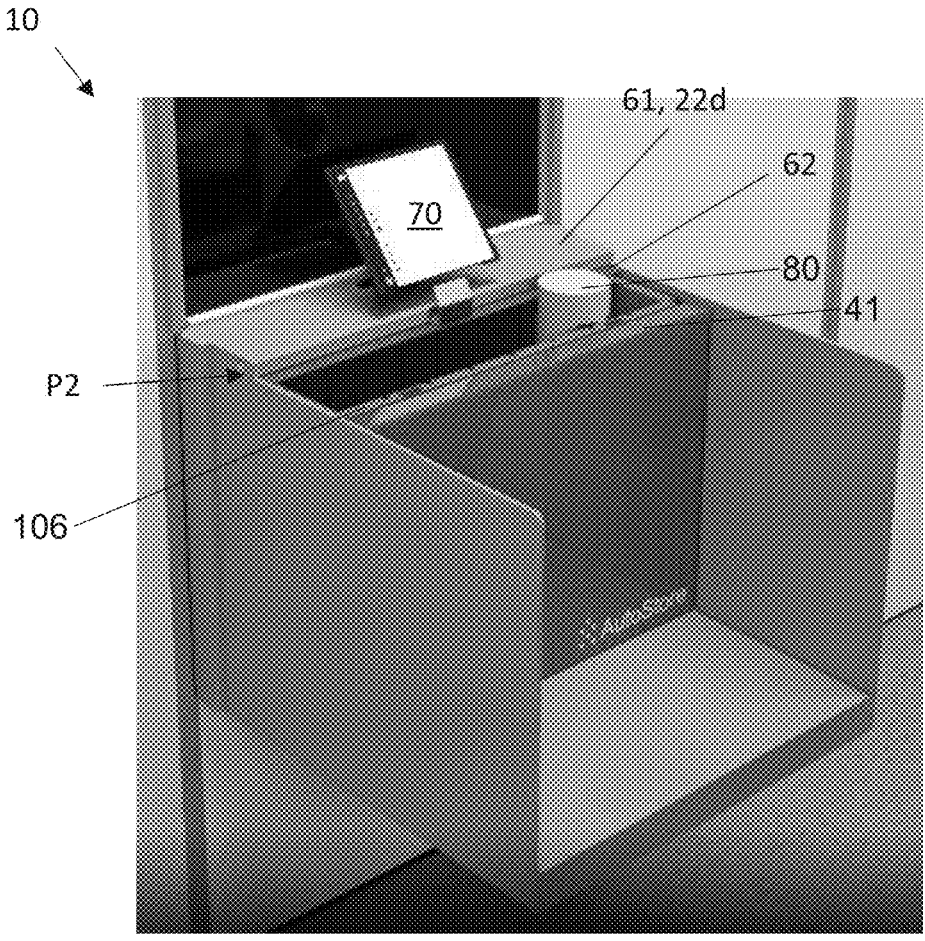
FIG. 8c illustrates the drawer being moved to a position in which the product item has moved the safety plate to an activated position.

It is now referred to FIG. 8c. Here, the movement of the drawer 40 has caused the product item 80 to push the safety plate 62 to an activated position P2. Now, the first part 65a of the sensor 65 has been moved away from the second part 65b of the sensor, and this is communicated to the control system 75. The control system 75 now controls the first actuator 71 to stop or reverse the movement of the drawer 40.

It is now referred to FIG. 6b. Fingers present in the gap indicated as "GAP" will bring the safety plate 62 from the non-activated position P1 (of FIG. 6a) to the activated position P2 (of FIG. 6b) as the drawer 40 is moving towards the retracted position RP.

Consequently, as shown and described above, the safety mechanism 60 prevents injuries when the access station is used to pick product items from the storage container and/or when the access station is used to insert product items into the storage container.

The safety mechanism during a container supplying/retrieving operation will now be described.

Figure 6C:
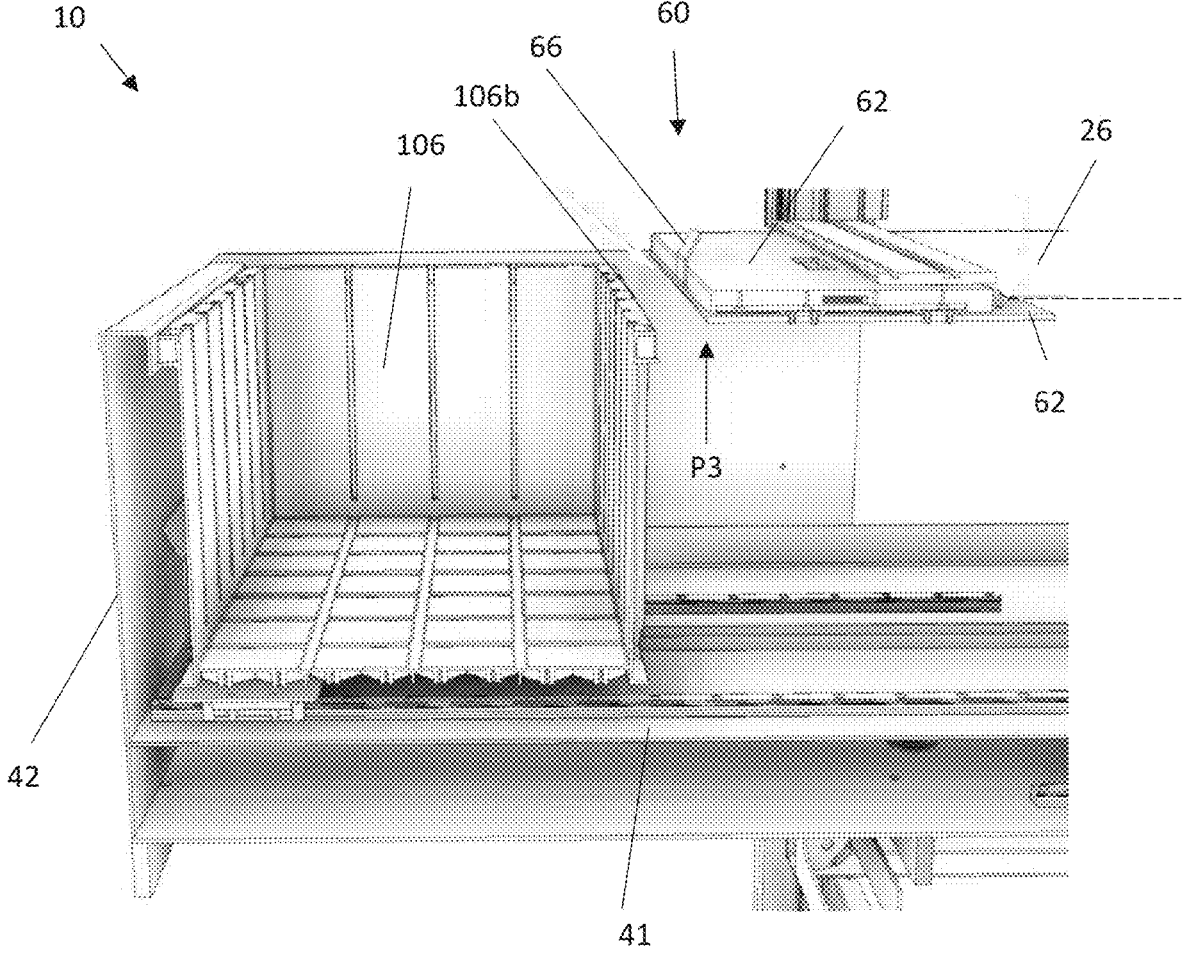
FIG. 6c corresponds to FIG. 6a and FIG. 6b, wherein the safety mechanism is set in an override mode.

It is now referred to FIG. 6c. Similar to FIG. 6a, the drawer 40 here is in the presentation position PP. However, the safety plate 62 is here moved to a container handling position P3 by means of the handle 66.

In this container handling position P3, the safety plate 62 is pushed away from the upper distal side edge 106b, thereby allowing the storage container 106 to be lifted up from the drawer 40, alternatively allowing a storage container 106 to be inserted into the drawer 40.

It should be noted that this will require the locking mechanism 67 to be released. This can be done by inputting an access code via the user interface, by using a key etc. It should further be noted that it is not possible for the operator to start the movement of the drawer 40 via the user interface when the safety plate 62 is in the container handling position P3. Hence, when the operator has either retrieved the storage container from the drawer or has inserted the storage container from the drawer, the operator must pull the safety plate 62 to the first position P1 before it is possible for the operator to start the movement of the drawer 40 via the user interface.

It should further be noted that in FIG. 6c, the safety plate 62 is partially obstructing the top opening 26. This may be an extra safety measure, to prevent movement of a storage container through the top opening 26.

ALTERNATIVE EMBODIMENTS

It should be noted that the locking mechanism 67 is not an essential feature. When the access station 10 is an internal access station, the locking mechanism will typically not be present, or it may be turned off, allowing the operator to use the handle 66 to push the safety plate 62 to the container handling position P3 without inputting an access code, using a key etc. However, for external access stations, the locking mechanism 67 is preferred.

In the preceding description, various aspects of the access station according to the invention have been described with reference to the illustrative embodiment. For purposes of explanation, specific numbers, systems and configurations were set forth in order to provide a thorough understanding of the system and its workings.

However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

1 Prior Art Automated Storage And Retrieval System
20 Access Module
21 Frame
22 Front Opening
22b Vertical Side Guiding Plates
22c Lower Horizontal Guiding Plate
22d Guard
25 Drawer Compartment
26 Top Opening
28 Lintels
40 Drawer
41 Drawer Base
42 Drawer Front
44 Support
60 Safety Mechanism
61 Cover
62 Safety Plate
63 Guides
65 Safety Sensor
65a First Sensor Part
65b Second Sensor Part
66 Handle
67 Releasable Locking Mechanism
70 User Interface
71 First Actuator
72 Second Actuator
75 Control System
80 Product Item
100 Framework Structure
102 Upright Members Of Framework Structure
104 Storage Grid
105 Storage Column
105a Transportation Column
106 Storage Container
106a Upper Proximal Side Edge
106b Upper Distal Side Edge
106' Particular Position Of Storage Container
107 Stack
108 Rail System
110 Parallel Rails In First Direction (X)
112 Access Opening
119 First Port Column
120 Second Port Column
201 Prior Art Container Handling Vehicle
201a Vehicle Body Of The Container Handling Vehicle 201
201b Drive Means/Wheel Arrangement/First Set Of Wheels In First Direction (X)
201c Drive Means/Wheel Arrangement/Second Set Of Wheels In Second Direction (Y)
301 Prior Art Cantilever Container Handling Vehicle
301a Vehicle Body Of The Container Handling Vehicle 301

301b Drive Means/First Set Of Wheels In First Direction (X)
301c Drive Means/Second Set Of Wheels In Second Direction (Y)
401 Prior Art Container Handling Vehicle
401a Vehicle Body Of The Container Handling Vehicle 401
401b Drive Means/First Set Of Wheels In First Direction (X)
401c Drive Means/Second Set Of Wheels In Second Direction (Y)
500 Control System
X First Direction
Y Second Direction
Z Third Direction
A1 Front Position
A2 Rear Position
OP Operator
P1 Non-Activated Position
P2 Activated Position
P3 Container Handling Position
PP Presentation Position
RP Retracted Position

The invention claimed is:

1. An access station for presentation of a storage container from an automated storage and retrieval system to an operator at the access station, wherein the access station comprises:

an access module comprising a frame defining a drawer compartment provided within the frame and a front opening for allowing presentation of the storage container;

a drawer comprising a drawer base and a drawer front, wherein the drawer is movably connected to the frame and wherein the drawer base comprises a support on which the storage container can be supported;

a first actuator for moving the drawer relative to the frame between a presentation position in which the drawer is protruding through the front opening of the frame and a retracted position in which the drawer is retracted within the drawer compartment;

wherein the access station comprises a safety mechanism located above the front opening;

wherein the safety mechanism comprises:

a cover secured to the frame;

a safety plate movable relative to the cover between a non-activated position and an activated position;

a safety sensor for sensing the movement of the safety plate;

wherein the access station is configured to allow movement of the drawer relative to the frame when the safety sensor is sensing that the safety plate is in its non-activated position and wherein the access station is configured to stop or reverse the movement of the drawer relative to the frame when the safety sensor has sensed that the safety plate is in its activated position.

2. The access station according to claim 1, wherein the safety plate prevents the storage container from being retrieved from the drawer when the safety plate is in the non-activated position.

3. The access station according to claim 1, wherein the safety plate prevents the storage container from being retrieved from the drawer when the safety plate is in the activated position.

4. The access station according to claim 1, wherein the access station comprises a control system configured to control the first actuator based on signals from the safety sensor.

5. The access station according to claim 1, wherein the frame comprises a guard defining an upper border of the front opening.

6. The access station according to claim 5, wherein the cover is at least partially forming the guard and wherein the safety mechanism is configured to trip in order to prevent an object from being squeezed between the drawer front and the guard during movement of the drawer from the presentation position to the retracted position.

7. The access station according to claim 3, wherein the safety plate is further movable relative to the cover to a container handling position when the drawer is in the presentation position; wherein the storage container may be retrieved from the drawer and/or the storage container may be inserted into the drawer when the safety plate is in the container handling position; and/or wherein the access station is configured to prevent movement of the drawer relative to the frame when the safety sensor has sensed that the safety plate is in the container handling position.

8. The access station according to claim 1, wherein the safety plate comprises a handle for manually moving the safety plate between the non-activated position and the activated position or for manually moving the safety plate between the non-activated position, the activated position and the container handling position.

9. The access station according to claim 1, wherein the access module comprises a top opening through which a storage container is retrievable from the drawer and through which a storage container is receivable by the drawer, and wherein the safety plate is at least partially obstructing the top opening in the activated position or in the container handling position.

10. The access station according to claim 7, wherein the safety mechanism comprises a releasable lock for preventing the safety plate to move to the container handling position, wherein the access station is configured to release the releasable lock if a predetermined condition is fulfilled.

11. The access station according to claim 1, wherein the safety plate is a rectangular, flat body slidably mounted to the cover.

12. The access station according to claim 1, wherein the cover comprises guides for guiding the safety plate relative to the cover.

13. A method for preventing a drawer closure in an access station of an automated storage and retrieval system, wherein the access station of an automated storage and retrieval system comprises an access module comprising a frame defining a drawer compartment provided within the frame and a front opening for allowing presentation of a storage container; a drawer comprising a drawer base and a drawer front, wherein the drawer is movably connected to the frame and wherein the drawer base comprises a support on which the storage container can be supported; a first actuator for moving the drawer relative to the frame between a presentation position in which the drawer is protruding through the front opening of the frame and a retracted position in which the drawer is retracted within the drawer compartment; wherein the access station comprises a safety mechanism located above the front opening; wherein the safety mechanism comprises a cover secured to the frame; a safety plate movable relative to the cover between a non-activated position and an activated position; a safety sensor for sensing the movement of the safety plate; wherein the access station is configured to allow movement of the drawer relative to the frame when the safety sensor is sensing that the safety plate is in its non-activated position and wherein the access station is configured to stop or reverse the movement of the drawer relative to the frame when the safety sensor has sensed that the safety plate is in its activated position;

wherein the method comprises:
  a) receiving a first storage container in the drawer when the drawer is in the retracted position within the access module;
  b) moving the drawer to the presentation position in which the first storage container is presented to the operator;
  c1) moving the drawer to the retracted position within the access module if a safety plate is maintained in the non-activated position; and/or
  c2) stopping/reversing the movement of the drawer if the safety plate is moved to the activated position.

14. A method for retrieving a storage container from or for supplying a storage container to an automated storage and retrieval system, wherein the method comprises:
  a) moving a drawer from a retracted position within an access module to a presentation position;
  b) moving a safety plate of a safety mechanism to a container handling position;
  c) retrieving the storage container from the drawer or supplying the storage container to the drawer;
  d) moving the safety plate to a non-activated position of the safety mechanism;
  e) moving the drawer from the presentation position to the retracted position;
  f) moving the storage container between the drawer and a storage column within the automated storage and retrieval system by a container handling vehicle.

15. The method according to claim 14, wherein e) further comprises:
  stopping or reversing the movement of the drawer from the presentation position to the retracted position if the safety plate is moved to an activated position.

* * * * *